United States Patent [19]
Flatten

[11] Patent Number: 5,383,630
[45] Date of Patent: Jan. 24, 1995

[54] MAIN DECK QUICK CHANGE CARGO SYSTEM

[75] Inventor: Jeffrey J. Flatten, Reading, Pa.

[73] Assignee: Teleflex Incorporated, Limerick, Pa.

[21] Appl. No.: 210,313

[22] Filed: Mar. 17, 1994

[51] Int. Cl.$^6$ ............................................. B64D 11/06
[52] U.S. Cl. .............................. 244/118.6; 244/137.1; 410/69; 410/115; 410/77
[58] Field of Search .............. 244/118.1, 118.5, 118.6, 244/137.1, 137.2; 410/80, 69, 46, 77, 82, 83, 90, 91, 115; 248/503.1

[56] References Cited

U.S. PATENT DOCUMENTS

| | | | |
|---|---|---|---|
| 3,381,921 | 5/1968 | McDonough et al. | 244/118 |
| 3,480,240 | 11/1969 | Del Guidice | 244/118.6 |
| 3,578,274 | 5/1971 | Ginn et al. | 244/118.6 |
| 4,000,870 | 1/1977 | Davies | 244/118 R |
| 4,396,175 | 8/1983 | Long et al. | 244/118.6 |
| 4,787,789 | 11/1988 | Stagars et al. | 410/69 |
| 4,936,527 | 6/1990 | Gorges | 244/118.6 |
| 4,957,121 | 9/1990 | Icenogle et al. | 244/118.5 |
| 4,989,809 | 2/1991 | Arnold | 244/137.1 |
| 5,131,606 | 7/1991 | Nordstrum | 244/118.5 |
| 5,230,485 | 7/1993 | Vogg et al. | 244/118.2 |

FOREIGN PATENT DOCUMENTS

| | | | |
|---|---|---|---|
| 1198680 | 8/1965 | Germany | 244/118.6 |
| 706614 | 3/1954 | United Kingdom | 244/118.6 |

Primary Examiner—Galen L. Barefoot
Attorney, Agent, or Firm—Reising, Ethington, Barnard, Perry & Milton

[57] ABSTRACT

An assembly (10) for rapidly converting the payload-bearing main deck (20) of an aircraft (22) between cargo-carrying capability and crash-worthy passenger-carrying capability includes a cargo conveyor (12) for transporting pallets (14) along the main deck (20), At least one passenger seat (16) is disposed on each pallet (14) Connectors (18) pass through the pallets (14) and connect the passenger seats (16) directly to the aircraft's main deck (20) to transfer seat loads resulting from rapid aircraft decelerations directly into the main deck (20). The connectors (18) each have a fastener (32) with a rectangular flange (48) which rotates 90 degrees into engagement with a cavity (54) in a seat attach fitting (24) fastened to the main deck (20).

16 Claims, 3 Drawing Sheets

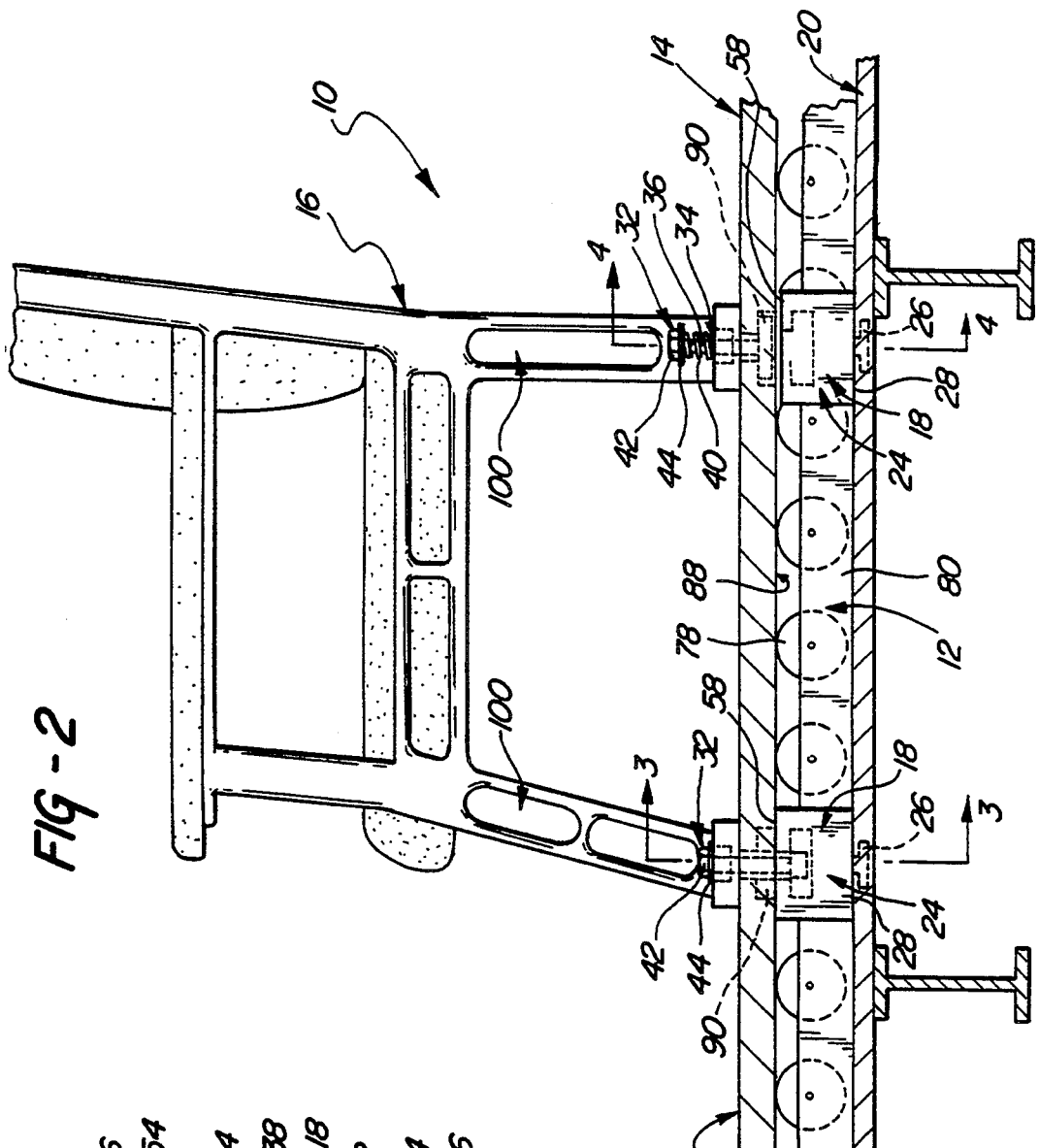
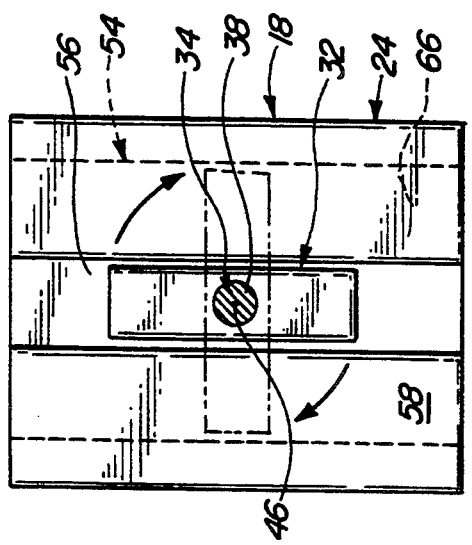

MAIN DECK QUICK CHANGE CARGO SYSTEM

TECHNICAL FIELD

This invention relates to systems for rapidly converting the payload-bearing main deck of an aircraft between cargo-carrying capability and passenger-carrying capability.

BACKGROUND OF THE INVENTION

Systems that convert aircraft between cargo and passenger carrying capability must meet federally-mandated airworthiness requirements. Where passengers are concerned, these requirements have become especially stringent. Passenger seats must be able to retain their integrity with the aircraft structure under loads resulting from 16 g's of longitudinal deceleration—forces associated with a typical crash scenario.

It is also highly advantageous for such systems to be as light as practical. This is true for a variety of reasons.

From an economic point of view, additional structural weight subtracts directly from the maximum payload capability of an aircraft and increases fuel consumption. Heavier components also make the conversion process more difficult and time-consuming.

From a safety standpoint, even where maximum payload limits are not a factor, additional structural weight reduces an aircraft's thrust-to-weight ratio and increases wing-loading. Consequently, each additional pound of aircraft weight increases takeoff rolls and decreases refusal speeds thus limiting takeoff abort options and requiring longer runways. Increased wing loading also reduces airborne maneuverability, and reduces both accelerated and unaccelerated stall margins.

Unfortunately, current aircraft conversion systems lack the capability to withstand the forces that would result from 16 g's of longitudinal deceleration. In addition, current systems require heavy, structural, flight-critical passenger seat pallets. Current systems' seats are attached to a heavy structural pallet that can distribute the seat loads through its own structure. These pallets are locked into a previously-installed cargo conveyor system using pallet or container locks or special locks that are part of the cargo system. Multiple seat rows that are mounted on the pallets distribute all loads into the pallet and the pallet distributes the loads into the cargo system. The cargo system then distributes the load into the aircraft structure. Therefore, under current systems, pallets are load-bearing and flight critical.

For example, U.S. Pat. No. 3,381,921 to F. M. McDonough et al., issued May 7, 1968 and assigned to The Boeing Company, discloses passenger seats mounted to seat pallets. It also includes a cargo conveyor system comprising rail assemblies installed longitudinally in an aircraft floor and carrying conveying rollers for pallets. The '921 patent also discloses seat pallets having latches for gripping the rails of the cargo conveyor system and holding the seat pallets in their flight positions. Thus, with this design, the seats distribute all crash loads into the pallets which must distribute the loads through the cargo system and into the aircraft structure. The pallets must, therefore, be heavy load-bearing and flight-critical structures.

SUMMARY OF THE INVENTION AND ADVANTAGES

The present invention is an assembly for rapidly converting the payload-bearing main deck of an aircraft between cargo-carrying capability and crash-worthy passenger-carrying capability. The assembly comprises cargo conveyor for transporting pallets along the main deck and at least one pallet moveably disposed on the cargo conveyor. At least one passenger seat is disposed on each pallet. Characterizing the assembly are connector means that pass through each pallet and directly connect the passenger seats to the main deck. This arrangement transfers seat loads resulting from rapid aircraft decelerations directly into the aircraft's main deck.

One advantage of transferring seat loads directly into the main deck is that the cargo system is not required to distribute any seat loads into the aircraft structure; the seat pallet becomes a non-load-bearing false floor. This allows the pallets to be lightweight, non-structural, and, therefore, non-flight-critical. The weight savings increases payload and the non-flight-critical nature of the pallet makes airworthiness certification much easier.

Another advantage of directly transferring seat loads into the main deck is that it makes it much easier to design safe palletized passenger seat systems capable of withstanding a required 16 g's of longitudinal crash loads. The previous requirement was for palletized seat systems to be capable of withstanding forces resulting from only 9 g's of longitudinal acceleration. It was practical to design systems to withstand 9 g's by connecting the seats to the pallets and the pallets to the 9 g-capable cargo system. To design a palletized seat system that connects to a cargo system and can withstand forces resulting from 16 g accelerations would be a formidable task. Unlike current systems, the present invention meets or exceeds the 16 g requirement and guarantees greater passenger safety by assuring proper seat attachment without depending on the pallet and cargo systems' integrity.

Still another advantage of the present invention is that it separates the seat attachment components from the cargo system. Each has its individual function. Therefore, neither affects the other as far as load distribution is concerned. In addition, it simplifies the system because the cargo system is not expected to both secure cargo and passenger seats.

One other advantage of the present invention is the ease with which an operator can change seat configuration. An operator may change configuration by simply changing the seat locations on the pallets and then changing the location of the seat attach fittings on the main deck. By comparison, existing systems require extensive seat pallet modification or replacement with new pallets having revised seat locations.

BRIEF DESCRIPTION OF THE DRAWINGS

To better understand and appreciate the advantages of this invention, refer to the following detailed description in connection with the accompanying drawings:

FIG. 2 is a fragmentary cross-sectional side view taken along line 2—2 of FIG. 1;

FIG. 5 is a top view of the seat attach fitting.

DETAILED DESCRIPTION OF THE PREFERRED EMBODIMENT

Figure 1:
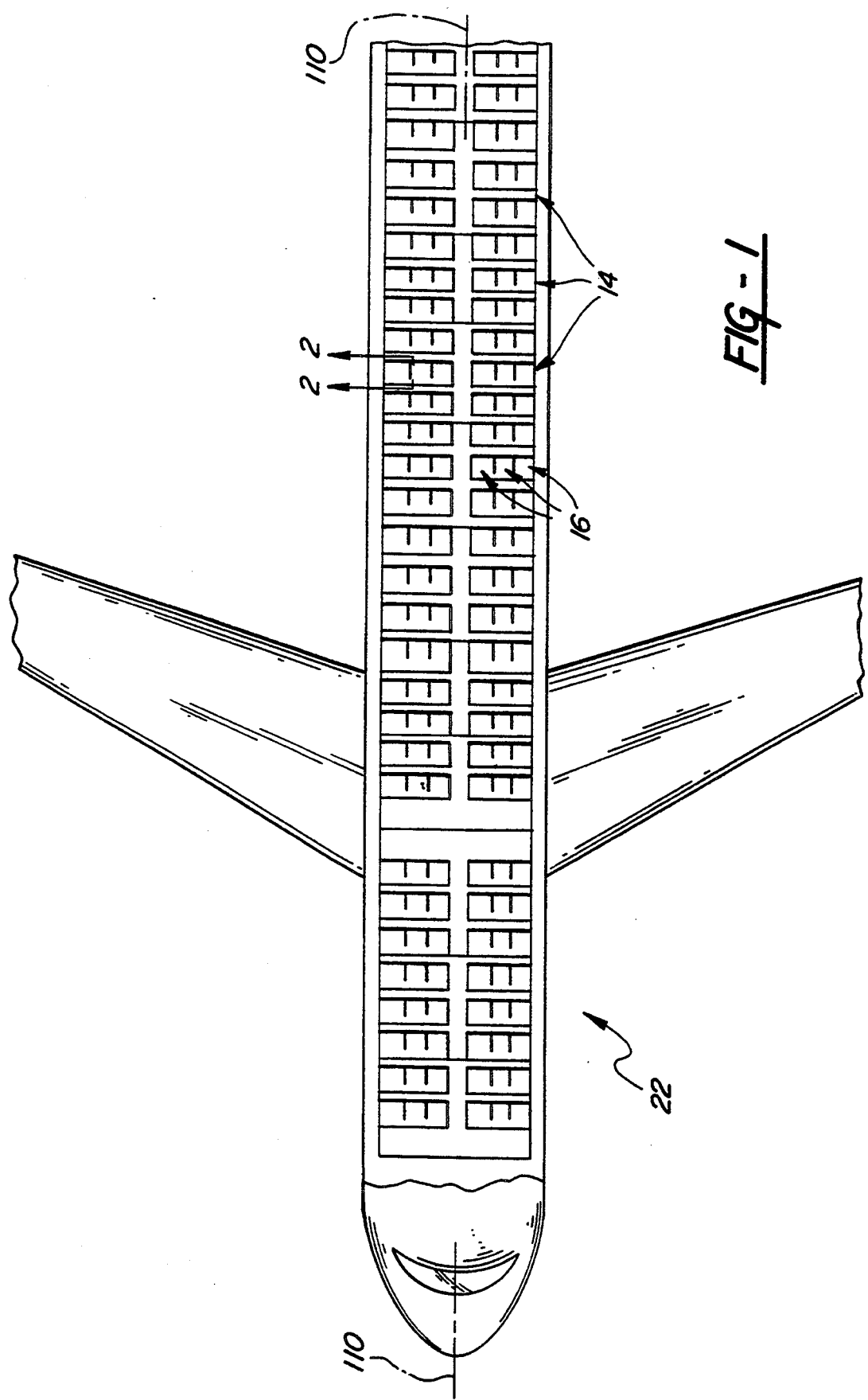
FIG. 1 is a fragmentary cross-sectional top view of an aircraft containing the invention with seat pallets in their flight positions.

The invention is an assembly 10 for rapidly converting the payload-bearing main deck 20 of an aircraft as shown at 22 in FIG. 1. The preferred embodiment of the instant invention is shown at 10 in FIGS. 2, 3 and 4. The assembly 10 includes a cargo conveyor 12 for transporting at least one pallet 14 along the main deck 20, with at least one passenger seat 16 disposed on each pallet 14. The assembly 10 also includes a connector 18 for connecting each passenger seat 16 to the load-bearing structure 20 of the aircraft 22 or other payload-carrying vehicle.

A connector be passes through the pallet 14 and directly connects each passenger seat 16 to the vehicle's 22 load-bearing structure 20, i.e., its main deck. The direct connection between each passenger seat 16 and the main deck 20 transfers seat loads resulting from rapid aircraft 22 decelerations directly into the main deck 20 rather than into the cargo conveyor 12.

Each connector 18 includes a seat attach fitting 24 disposed between the main deck 20 and the seat pallet 14. In the preferred embodiment, each seat attach fitting 24 has the general shape of a rectangular prism or cube. The seat attach fitting 24 includes a seat track fitting 26, disposed on the seat attach fitting's base 28. The main deck 20 includes standard seat tracks 30 as are commonly found on passenger aircraft main decks 20. The seat track fitting 26 is constructed to removably secure the seat attach fitting 24 to one of the conventional seat tracks 30 which exist as part of the permanent floor structure 20, or main deck 20, of many present day passenger aircraft 22.

Figure 4:
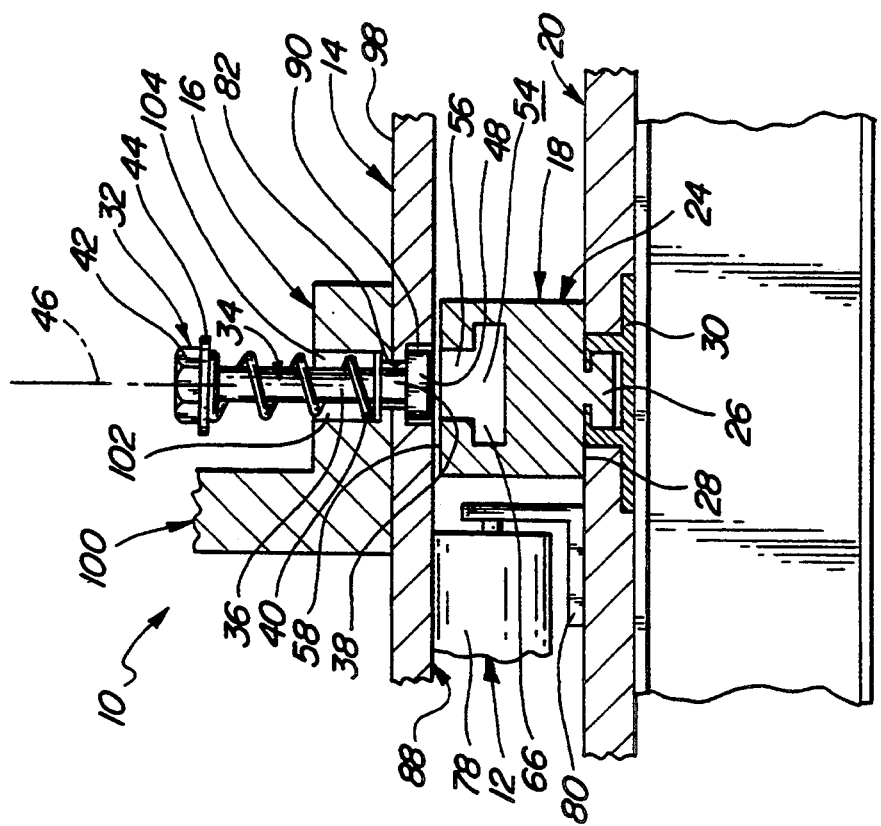
FIG. 4 is a cross-sectional view of the invention, taken along line 4—4 of FIG. 2.
Figure 3:
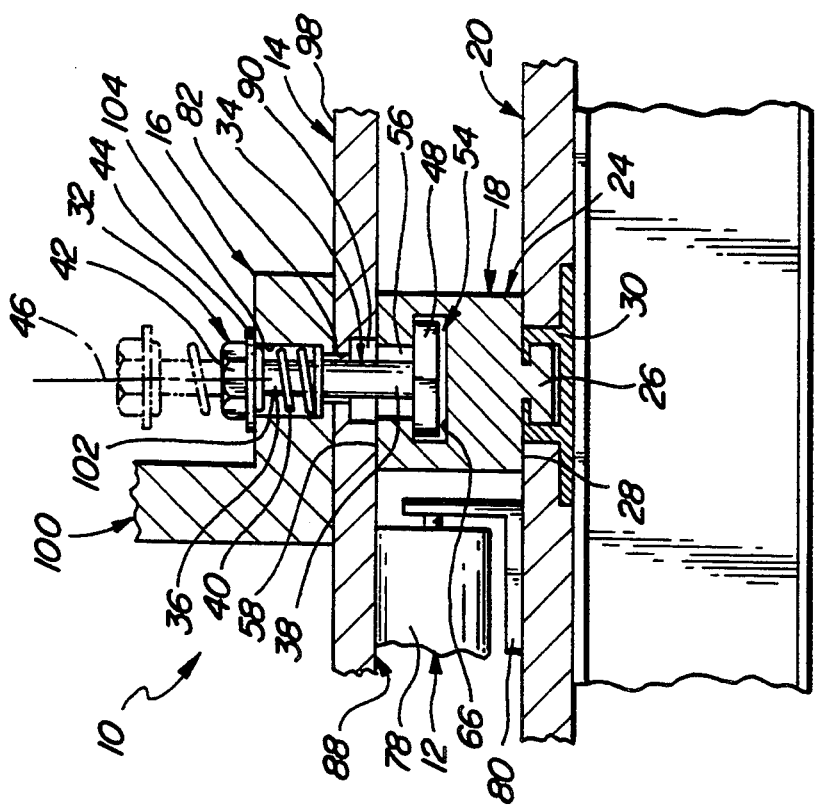
FIG. 3 is a cross-sectional view taken along line 3—3 of FIG. 2.

Each connector 18 includes a seat attach fastener 32 having an engaged position for releasably attaching the seat 16 to the seat attach fitting 24 and a retracted position for attaching the seat 16 to the seat pallet 14. FIG. 3 best illustrates the seat attach fastener's 32 engaged position and also shows its retracted position in phantom. FIG. 4 best illustrates the seat attach fastener's 32 retracted position. In addition, FIG. 2 shows two seat attach fasteners 32 with one in the engaged position and one in the retracted position.

Each seat attach fastener 32 has a fastener shaft 34 with a first 36 and second 38 shaft end. In the engaged position shown in FIG. 3, the fastener shaft 34 passes through a portion of the seat 16, the seat pallet 14, and into the seat attach fitting 24. In the retracted position shown in FIG. 4, the fastener shaft 34 passes through a portion of the seat 16 and into the seat pallet 14.

The connector 18 includes a cylindrical coil spring 40 disposed around the first shaft end 36 for upwardly biasing the seat attach fastener 32 toward the engaged position. The spring 40 also upwardly biases the seat attach fastener 32 toward the retracted position. The spring 40 has an inner diameter greater than the fastener shaft's outer diameter.

The seat attach fastener 32 has a head 42 fixedly attached to the first shaft end 36 for downwardly retaining the spring 40. In the preferred embodiment, the head 42 comprises a standard hexagonal bolt head 42 with an integral washer 44 disposed adjacent the bolt head's base. In the preferred embodiment the washer 44 has a larger outside diameter than the bolt head 42. The washer 44 need not be integral. In addition, the bolt head 42 may have a large enough diameter to obviate the need for a separate or integral washer 44. The bolt head 42 need not be hexagonal, but may be in any configuration that allows installers to depress and rotate the seat attach fastener 32.

The seat attach fastener 32 includes a central axis 46 and a rectangular flange 48 integrally disposed at the second shaft end 38 perpendicular to the central axis 46. The rectangular flange's 48 length is less than the seat attach fitting's 24 length and width.

The seat attach fitting 24 includes a cavity 54 for receiving and allowing the rectangular flange 48 to rotate and retract under the spring's 40 upward bias into the engaged position. In the preferred embodiment, the cavity 54 has a rectangular slot 56 disposed in the seat attach fitting's 24 upper surface 58. The slot is wider and longer than the rectangular flange The slot's 56 width is less than the rectangular flange's 48 length. Below the seat attach fitting's upper surface 58, the cavity 54 opens into a tunnel 66. The tunnel's 66 width is greater than the rectangular flange's 48 length and is taller than the rectangular flange 48 is deep. In the preferred embodiment, the tunnel 66 has a constant rectangular cross-sectional shape and has a length equal to the fitting's 24 length. The tunnel may, however, have any shape that will allow the rectangular flange 48 to rotate through 90 degrees and into the engaged position.

The seat attach fasteners 32 need not conform to the specific configuration depicted. Any one of a number of different commonly-known fasteners, such as that disclosed in U.S. Pat. No. 5,230,485, issued to Guenter Vogg and Juergen Wieck, may be used.

The cargo conveyor 12 height exceeds the seat attach fitting 24 height above the main deck 20. The cargo conveyor 12 height is greater than the seat attach fitting 24 height to allow installers to first install the seat attach fittings 24 before rolling the seat pallets 14 into position. In other words, the seat attach fitting 24 height is less than the cargo conveyor 12 height to prevent the seat attach fittings 24 from interfering with the seat pallets' 14 conveyance across the main deck 20.

In the preferred embodiment, the cargo conveyor 12 comprises a plurality of cargo rollers 78. The cargo rollers 78 have roller brackets 80 for fixedly connecting the rollers 78 to the main deck 20. Alternatively, the roller brackets 80 may be in the form of a continuous U-shaped channel common to an entire strip of rollers 78. The cargo conveyor 12 may be any one of a number of cargo systems that are either in use or commonly known in the art, and may also include "ball matt" systems. The cargo conveyor 12 is kept separate from the seat connectors 18 and therefore may be powered or un-powered and can be of any type or system height.

The assembly 10 also includes at least one pallet 14 moveably disposed on the cargo conveyor 12. The pallets 14 each have pallet holes 82 with diameters slightly greater than the fastener shafts' 34 diameters for allowing the fastener shafts 34 to pass through. The pallets 14 have pallet lower surfaces 88 with recesses 90 disposed adjacent the pallet holes 82. The recesses 90 are deeper, wider and longer than the rectangular flanges 48. The recesses 90 allow the spring 40 to retain the rectangular flange 48 with the seat attach fastener 32 in its retracted position. In the retracted position, therefore, the rectangular flange 48 is recessed into the seat pallet 14. The rectangular flange 48 is recessed to preclude its interference with the cargo conveyor 12 as installers convey the seat pallets 14 across the aircraft main deck 20. In the retracted position, the seat attach fasteners 32 also hold the seats 16 to the seat pallets 14 by applying spring-biased compressive force.

In the preferred embodiment, the seat pallets 14 are lightweight and non-flight-critical. In a crash or rapid deceleration, the seat pallets' 14 structural integrity need not be maintained to prevent the seats 16 from breaking loose. As a result, the seat pallets 14 only need sufficient structural strength to support the seats 16 during transport, installation, and removal.

The passenger seats 16 are disposed on the pallet upper surfaces 98. The passenger seats 16 each include at least one leg 100 for connecting the seats 16 to the pallets 14 and the seat attach fittings 24. In the preferred embodiment, each passenger seat 16 has four legs 100. Each leg 100 has a hole 102 for allowing the seat attach fastener shaft 34 to pass through. The leg holes 102 are disposed over and are concentric with the pallet holes 82. Referencing FIG. 4, each leg hole's 102 upper diameter is slightly greater than the springs' 40 outer diameter. The larger upper diameter forms a counter-bore 104 that accommodates the spring 40. The leg holes' 102 lower diameters are smaller than the springs' 40 outer diameters for upwardly retaining the spring 40. The fastener shaft's 34 diameter is slightly smaller than the leg hole's 102 lower diameter.

Although, in the preferred embodiment, the term "passenger seat" refers to an individual passenger seat 16, in other embodiments "passenger seat" may refer to a rack of multiple interconnected passenger seats 16.

In the preferred embodiment, the assembly 10 includes a plurality of pallets 14. The pallets 14 each include a plurality of passenger seats 16. Each of the pallets 14 has a flight position on the main deck 20. The pallets' 14 flight positions are those positions where installers position and secure the pallets 14 and seats 16 for flight. The present invention accommodates any number of pallets 14 depending on an aircraft's 22 length and width.

The seat attach fitting cavities 54, leg holes 102 and pallet holes 82 each have respective central axes, shown coincidentally disposed at 46 in FIGS. 3 and 4. Installers position the seat attach fittings 24 on the main deck 20 so that each of the leg hole axes and pallet hole axes align with a cavity axis at 46 when the pallets 14 are in their respective flight positions.

The seat pallet recesses 90 are oriented to align with the seat attach fittings' 24 rectangular slots 56 when the pallets 14 are in their respective flight positions. In the preferred embodiment, the pallet recesses 90 and the rectangular slots 56 are parallel to the aircraft's longitudinal axis 110.

Therefore, to convert an aircraft 22 from cargo to passenger-carrying capability, once the cargo conveyor 12 has been in,tailed, personnel need only install the seat attach fittings 24 at predetermined positions along the existing seat tracks 30, convey the seat pallets 14 on the cargo conveyor 12 into their respective flight positions over the seat attach fittings 24, and depress the seat attach fasteners 32 into the seat attach fittings 24 and twist the seat attach fasteners 32 into their respective engaged positions.

Removal is a straightforward reversal of the installation procedure. To convert an aircraft 22 from passenger carrying capability to cargo capability, personnel need only move the seat attach fasteners 32 to their retracted position, roll the seat pallets 14 out of the aircraft 22 and either remove the seat attach fittings 24 from the seat tracks 30 or leave them in place.

In essence, in the preferred embodiment, the connectors 18 act in the same way as the original seat track attachments for the seats except that they allow vertical clearance between the cargo conveyor 12 and the seat pallet 14.

I intend the above terminology to illustratively describe the invention's preferred embodiment and not to limit the invention's scope.

Obviously, many modifications and variations of this invention are possible in light of the above teachings. Within the scope of the appended claims, in which reference numerals are merely for convenience and are not limiting, one may practice the invention other than as the above specification describes.

I claim:

1. An assembly (10) for rapidly converting the payload-bearing main deck (20) of an aircraft (22) between cargo-carrying capability and crash-worthy passenger-carrying capability, said assembly (10) comprising:

cargo conveyor means (12) for transporting pallets (14) along the main deck (20);

a pallet (14) moveably disposed on said cargo conveyor means (12);

at least one passenger seat (16) disposed on said pallet (14); and characterized by connector means (18) passing through said pallet (14) for directly connecting said passenger seat (16) to the main deck (20) to transfer seat loads resulting from rapid aircraft decelerations directly into the main deck (20) thereby reducing said pallet's (14) structural load-carrying requirements so that said pallet (14) can be manufactured from lighter and less expensive materials.

2. An assembly (10) as set forth in claim 1 further characterized by said connector means (18) including a seat attach fitting (24).

3. An assembly (10) as set forth in claim 2 further characterized by said connector means (18) including a seat attach fastener (32).

4. An assembly (10) as set forth in claim 3 further characterized by said seat attach fastener (32) having a fastener shaft (34) with a first (36) and second (38) shaft end.

5. An assembly (10) as set forth in claim 4 wherein said seat attach fastener (32) has an engaged position and a retracted position, further characterized by said connector means (18) having a cylindrical coil spring (40) disposed around said first shaft end (36) for biasing said seat attach fastener (32) into one of said engaged and retracted positions.

6. An assembly (10) as set forth in claim 5 further characterized by said seat attach fastener (32) having a head (42) fixedly attached to said first shaft end (36).

7. An assembly (10) as set forth in claim 6 wherein said seat attach fastener (32) includes a central axis (46), further characterized by said seat attach fastener (32) having a rectangular flange (48) integrally disposed at said second shaft end (38) perpendicular to said central axis (46).

8. An assembly (10) as set forth in claim 7 further characterized by said seat attach fitting (24) including a cavity (54) for receiving said rectangular flange (48) in said engaged position.

9. An assembly (10) as set forth in claim 8 further characterized by said cavity (54) having a rectangular slot (56) disposed in said fitting upper surface (58) for receiving said rectangular flange (48) into said cavity (54).

10. An assembly (10) as set forth in claim 2 wherein said cargo conveyor means (12) has a conveyor height above said main deck (20), further characterized by said seat attach fitting (24) having a fitting height above said main deck (20) that is less than said conveyor height.

11. An assembly (10) as set forth in claim 10 further characterized by said cargo conveyor means (12) including a plurality of cargo rollers (78).

12. An assembly (10) as set forth in claim 11 further characterized by said cargo rollers (78) having roller attachment means (80) for fixedly connecting said rollers (78) to the main deck (20).

13. An assembly (10) as set forth in claim 12 wherein said pallet (14) has a pallet lower surface (88), further characterized by said pallet lower surface (88) including recesses (90) for retaining said rectangular flange (48) with said seat attach fastener (32) in its retracted position.

14. An assembly (10) as set forth in claim 13 further characterized by each said seat (16) having a counterbore (104) for accommodating said spring (40).

15. An assembly (10) as set forth in claim 1 further characterized by said passenger seat (16) comprising a rack of multiple interconnected passenger seats (16).

16. An assembly (10) for rapidly converting the payload-bearing main deck (20) of an aircraft (22) between cargo-carrying capability and crash-worthy passenger-carrying capability, said assembly (10) comprising:
   cargo rollers (78) for transporting pallets (14) along the main deck (20);
   a pallet (14) moveably disposed on said cargo rollers (78);
   at least one passenger seat (16) disposed on said pallet (14); and
   characterized by a connector (18) passing through said pallet (14) for directly connecting said passenger seat (16) to said main deck (20) to transfer seat loads resulting from rapid aircraft decelerations directly into the main deck (20).

* * * * *